US012297092B2

(12) United States Patent
Luth et al.

(10) Patent No.: US 12,297,092 B2
(45) Date of Patent: May 13, 2025

(54) VALVE FOR A BEVERAGE CONTAINER

(71) Applicant: Heineken Supply Chain B.V., Amsterdam (NL)

(72) Inventors: Henderikus Hilvert Luth, Paterswolde (NL); Frans Wiebe Rozeboom, Assen (NL); Johan Onnekink, Haren (NL); Alexander Patje, Zuidwolde (NL); Johannes Rogier De Vrind, Haren (NL); Arie Maarten Paauwe, Amsterdam (NL)

(73) Assignee: Heineken Supply Chain B.V., Amsterdam (NL)

( * ) Notice: Subject to any disclaimer, the term of this patent is extended or adjusted under 35 U.S.C. 154(b) by 0 days.

(21) Appl. No.: 17/925,631

(22) PCT Filed: May 19, 2021

(86) PCT No.: PCT/NL2021/050320
§ 371 (c)(1),
(2) Date: Nov. 16, 2022

(87) PCT Pub. No.: WO2021/235934
PCT Pub. Date: Nov. 25, 2021

(65) Prior Publication Data

US 2023/0166958 A1 Jun. 1, 2023

(30) Foreign Application Priority Data

May 19, 2020 (NL) .................................... 2025622

(51) Int. Cl.
*B67D 1/08* (2006.01)

(52) U.S. Cl.
CPC ................................ *B67D 1/0835* (2013.01)

(58) Field of Classification Search
CPC ........................... B67D 1/0835; B67D 1/0831
See application file for complete search history.

(56) References Cited

U.S. PATENT DOCUMENTS

| | | | | |
|---|---|---|---|---|
| 5,431,205 A * | 7/1995 | Gebhard | B67D 3/0032 | 141/351 |
| 6,325,100 B1 * | 12/2001 | Bunschoten | F16L 37/35 | 251/149.6 |
| 6,367,660 B1 * | 4/2002 | Chang | B67D 1/0838 | 222/509 |

(Continued)

FOREIGN PATENT DOCUMENTS

| | | | |
|---|---|---|---|
| EP | 0294719 A1 * | 12/1988 |
| WO | 2014070003 A2 | 5/2014 |

OTHER PUBLICATIONS

NPL "TRP"—"The benefits and uses of PTFE" by "TRP Polymer Solutions"—Publicly available since Jul. 2018 (Year: 2018).*

(Continued)

*Primary Examiner* — David Colon-Morales
(74) *Attorney, Agent, or Firm* — Banner & Witcoff, Ltd.

(57) ABSTRACT

A valve for a beverage container comprises a mounting element for mounting the valve in a container opening. A valve body is axially moveable inside the valve housing from a first position closing off the beverage outlet opening to a second position opening a fluid connection through the beverage outlet opening.

14 Claims, 7 Drawing Sheets

(56) References Cited

U.S. PATENT DOCUMENTS

| | | | | |
|---|---|---|---|---|
| 6,516,839 | B1 * | 2/2003 | Timp | B67D 1/0832 141/2 |
| 6,942,127 | B2 * | 9/2005 | Raats | B67D 1/0462 137/212 |
| 8,851,322 | B2 * | 10/2014 | Landman | B29C 49/12 220/613 |
| 8,851,340 | B2 * | 10/2014 | Kreyenberg | B67D 1/0418 137/212 |
| 8,906,438 | B2 * | 12/2014 | Landman | B67D 1/0801 426/115 |
| 9,399,569 | B2 * | 7/2016 | Smith | B67D 1/0808 |
| 10,258,940 | B2 * | 4/2019 | Van Damme | B67D 1/0891 |
| 10,882,671 | B2 * | 1/2021 | Paauwe | B67D 1/0835 |
| 11,006,771 | B2 * | 5/2021 | Paauwe | B67D 1/1272 |
| 11,072,477 | B2 * | 7/2021 | Covi | B67D 1/0462 |
| 11,292,157 | B2 * | 4/2022 | Covi | B67D 1/0835 |
| 11,358,852 | B2 * | 6/2022 | Paauwe | B67D 1/16 |
| 11,548,774 | B2 * | 1/2023 | Covi | B67D 1/0807 |
| 11,724,930 | B2 * | 8/2023 | Paauwe | B67D 1/0081 222/394 |
| 2016/0130070 | A1 * | 5/2016 | Orr | B65D 83/0055 222/105 |
| 2021/0371267 | A1 * | 12/2021 | Walton | F16K 15/063 |

OTHER PUBLICATIONS

International Search Report issued in corresponding application No. PCT/NL2021/050320 dated Aug. 5, 2021, 4 pages.

* cited by examiner

VALVE FOR A BEVERAGE CONTAINER

FIELD OF THE INVENTION

The invention relates to a valve for a beverage container. The invention further relates to a beverage container comprising a valve arranged for closing and opening of the beverage container.

BACKGROUND

Beverage containers filled with beverage, especially a gas containing beverage such as beer, wort based drinks, Ciders, Radlers and soft drinks, are well known in the art and come in different shapes and sizes and can be made of various materials, usually metal or plastic. Known beverage containers are provided with a valve that allows for sealing the beverage in the container from an outside environment at least prior to use and for dispensing of the beverage upon use.

In most of the known containers, such as a keg, a Bag-in-Container (BIC), or a Bag-in-Bottle or Bag-in-Box or Bottle-in-Bottle (BIB) container, use is made of valves which are mounted to a neck of the container. For example a valve for a beverage container is known from WO2014/070003 and comprises a mounting element for mounting the valve in a container opening provided in the neck of the beverage container. The mounting element extents radially from an inner side defining a fluid passage through the mounting element to an outer peripheral side that is arranged for sealing against a container edge at the container opening. The mounting element is coupled to a valve housing comprising a housing side wall extending axially from a housing top wall to a housing bottom wall. The housing top wall is sealed against a lower side of the mounting element by means of a gasket interposed between the housing top wall and the mounting element. The gasket has a central hole axially aligned with the fluid passage of the mounting element and a beverage outlet opening in the housing top wall so that a beverage flow from the valve housing through the gasket hole and the mounting element is possible while preventing leakage of beverage between the valve housing and mounting element. The housing side wall has a beverage inlet opening so that beverage flow from the beverage container into the valve housing is possible. The valve comprises a valve body loaded by a metal spring provided within the valve housing supported on the housing bottom wall so that the valve body is biased axially towards the mounting element, against the gasket and closing off the beverage outlet opening. The valve body is operable to axially move inside the valve housing from a first position, closing off the beverage outlet opening, to a second position opening a fluid connection through the beverage outlet opening, for example by introducing a spout of a dispenser unit such as a dispense adapter through the fluid passage and sealingly through the hole in the gasket, for engaging the valve body and forcing the valve body against the spring away from the gasket for opening the valve.

The known valve when used in a beverage container satisfactorily provides a beverage contained in the beverage container to be sealed from the environment by maintaining the valve body against the gasket and closing off the beverage outlet opening, whereas the beverage can be dispensed from the container whenever desired by operating the valve body to move away from the gasket. Notwithstanding the above it may be desirable to use a valve without metal spring or without a spring altogether. For example a metal spring may affect a recyclability of the valve or a beverage container in which the valve is mounted, and the application of a spring in general may affect a durability of the valve.

Accordingly, an aim of the invention is to provide an alternative valve for a beverage container. A particular aim of the invention is to provide a valve that is free of metal and/or a valve free of a spring and/or a valve that is free of a metal spring. An aim of the present invention is to provide for a valve which is easy to manufacture and is relatively inexpensive and/or is easily and conveniently recyclable. An aim of the present invention is to provide for a valve which enables easy closure of a beverage container, and especially easy mounting of the valve, even in line on a filling line or filling station, for example in a wet environment.

Another aim of the invention is to provide an alternative beverage container having a valve. Particularly it is an aim of the present invention to provide an alternative container comprising a gaseous beverage, especially a carbonated beverage, which is compressible for dispensing the content through a valve provided in the container. The container can be a self contained container or part of a BIC or BIB type container. An aim of the present invention is to provide for a container with valve which is recyclable.

DESCRIPTION OF THE INVENTION

At least one or some of these and other aims and objects of the invention may be obtained by a container and/or valve according to the herein described aspects or embodiments as disclosed in this document.

According to a first aspect there is provided a valve for a beverage container comprising a mounting element for mounting the valve in a container opening of the beverage container, the mounting element radially extending from an inner side defining a fluid passage through the mounting element to an outer peripheral side for sealing against a container edge at the container opening, the mounting element coupled to a valve housing comprising a housing side wall extending axially from a housing top wall sealed against the mounting element to a housing bottom wall, the housing top wall having a beverage outlet opening aligned with the fluid passage and the housing side wall having a beverage inlet opening, wherein a valve body is axially moveable inside the valve housing from a first position closing off the beverage outlet opening to a second position opening a fluid connection through the beverage outlet opening, wherein the valve body comprises a closed upper end section fixedly received in the beverage outlet opening in the first position and operable to be moved away from the beverage outlet opening to the second position axially past at least a part of the beverage inlet opening in the side wall, and a lower end section extending axially from the closed upper end in the direction of the housing bottom wall, the lower end arranged to contact an inner surface of the housing at least in the second position.

The valve body may have the upper end section configured and shaped to clampingly fit in the beverage outlet opening in the first position. The valve body may comprise an elastic material or be made of an elastic material. The valve body may for example be wholly made of plastic. The upper end section of the valve body may particularly comprise an elastically deformable radial outer surface at least partly compressed by the housing top wall in the first position of the valve body. As such the valve body is kept in the first position closing the beverage outlet opening in rest, i.e. prior to operating the valve body to move to the second position opening the beverage outlet opening, without need of a spring or other biasing means. Particularly the upper end section or the whole valve body may be a plug-like member acting as a radially fixed plug within the beverage outlet opening in the first position.

The valve body is operable to axially move inside the valve housing from the first position, closing off the beverage outlet opening, to the second position opening a fluid connection through the beverage outlet opening. This may for example be realized by introducing a spout of a dispenser unit such as a dispense adapter through the fluid passage, pushing against the upper end section of the valve body.

The upper end section of the valve body is preferably designed to be held by a fixing force, e.g. clamping force, in particular a radial fixing force, in the beverage outlet opening that reliably secures the valve body in the first position, e.g. the valve under normal circumstances will not open unless deliberately operated by a user, while the fixing force can be easily overcome by manual force from a user. For instance the valve enables a beverage container in which it is applied to remain closed from an outside environment whereas a beverage in the beverage container can be dispensed when desired at any time by manually pushing against the valve body for example with a spout of a dispenser unit.

The valve in the second position of the valve body may be fully open, i.e. a flow of beverage is enabled through the beverage inlet opening and beverage outlet opening when the valve body is in the second position, to allow dispensing of beverage contained in the beverage container in which the valve is applied.

To prevent the beverage inlet opening from becoming unwantedly blocked or closed off due to uncontrolled positioning of the valve body inside the valve housing, which could affect beverage dispensing properties of the beverage container, e.g. lower a dispensing rate or prevent dispensing of beverage altogether, the lower end section of the valve body is arranged to contact an inner surface of the housing at least in the second position. The lower end section contacting the inner surface of the housing limits a freedom of movement of the valve body in at least the second position, thus lowering a risk of the valve body when moved to the second position from blocking or closing off the beverage inlet opening in the valve housing side wall due to it being misplaced in the valve housing.

Preferably the lower end section is radially constrained by a lower portion of the valve housing side wall in the second position of the valve body. For example the valve body lower end section may comprise a circumferential wall having an outer surface wherein at least part of the outer surface is arranged to radially abut against the inner surface of the valve housing.

Preferably at least the lower end section of the valve body is guided by the valve housing inner surface when moved from the first position to the second position. For example the circumferential wall abuts with its outer surface against the inner surface of the valve housing in the first position and slides along the inner surface towards the housing bottom wall when the valve body is moved from the first position to the second position. Particularly an outer diameter of the lower end section of the valve body and an inner diameter of the valve housing may be at least approximately the same. A radial abutment between the outer surface and inner surface may be at least substantially liquid tight. The valve body may for instance form a piston axially movable through the valve housing displacing a fluid volume upon movement. One or both of the outer surface and inner surface may be smooth. One or both of the outer surface and inner surface may be irregular with protrusions and corresponding recesses, such as a corrugated surface, or one or more ribs and corresponding grooves, which assist in correct positioning of the valve body in the housing when moved from the first position to the second position. This or other means may prevent rotation of the valve body around its longitudinal axis when moved from the first position to the second position. The outer surface and/or inner surface may comprise or be provided with openings, for example grooves, to allow a flow of beverage between the surfaces in use of the valve. For example the outer surface and inner surface do not abut in a liquid-tight manner around the full circumference.

The valve may have the valve body comprising a solid element such as a rod or rod-like element as lower end section. In an aspect the valve has the circumferential wall forming a hollow element, particularly a hollow tube, closed on one side by the upper end section and open on an opposite side facing the housing bottom wall. Instead of a solid body, a hollow element or body such as a tube requires less displacement of fluid when moving the valve body in the valve housing filled with beverage and accordingly is easier to move. Moreover such hollow body requires less material and may thus be lighter in weight and less costly to produce. In use of the valve in a beverage container a cavity defined by the hollow element may be filled with beverage and fluid can be exchanged between the cavity and a space in the valve housing outside of the hollow body through the open side facing the housing bottom wall.

In a particular aspect the valve has the lower end section with the hollow element and the upper end section forming a valve body that is arranged to be biased in use by a buoyant force from the beverage acting on the valve body such that the valve body stays in or returns to the first position. The valve body may be biased to support maintaining a liquid-tight seal of the beverage outlet opening in the first position. The valve body in use may be operated with manual force sufficient to overcome the buoyant force to axially move inside the valve housing from the first position, closing off the beverage outlet opening, to the second position opening a fluid connection through the beverage outlet opening. The valve body may particularly be configured to have a buoyancy that enables an at least substantial liquid-tight seal of the beverage outlet opening in use of the valve after the valve has been opened. For example, the valve body may be arranged to re-seal the beverage outlet opening by returning to its first position after removal of the force that operates the valve body to move from its first position to the second position. Preferably in use of the valve in a beverage container a beverage volume between the upper end section of the valve body and the beverage outlet opening in the second position of the valve body is smaller than a beverage volume below the upper end section in the valve housing in the second position of the valve body. Particularly in use of the valve in a beverage container the smaller beverage volume between the upper end section of the valve body and the beverage outlet opening will be emptied relatively quickly upon removal of the force that operates the valve body to move from its first position to the second position, thereby creating a temporary local under pressure above the valve body which together with the buoyance force on the valve body enables a reliable liquid-tight re-sealing of the beverage outlet opening. A beverage container comprising such valve is accordingly re-broachable. The valve may have the valve body arranged as a suitable valve body to this end by providing a specific shape, e.g. with the outer surface shaped to liquid tightly seal against the inner surface of the valve housing in the second position such that a liquid flow between the volume above the valve body and a volume below the valve body is reduced or at least almost completely prevented, and/or the valve body provided mainly hollow, and/or by using materials with a suitable low density.

In a further aspect the valve may comprise positioning means arranged to guide the valve body to a third position in which it is correctly positioned within the valve housing to allow the valve body to return into its first position after removal of the force that operated the valve body to move from its first position to the second position. The positioning means may for example comprise a spring or spring-like member, for example a helical spring, that is positioned between the valve housing bottom wall and the valve body. The spring does not have to be a relatively high force metal spring as used in the prior art valve for biasing the valve body to remain in the closed position, but instead can be a relatively simple low force recyclable spring, e.g. made of plastic, as it only has to be arranged to correctly position the valve body such that it can be moved back in its first position. A correct position of the valve body may be that the valve body has the upper end section aligned with the beverage outlet opening such that it can axially move back into the outlet opening.

In an aspect the valve has the upper end section of the valve body and lower end section of the valve body made of one piece. The upper end section and the lower end section may thus be made of the same material. The upper end section and the lower end section may for example be made of the same elastic material. Preferably the upper end section and the lower end section are made of a thermoplastic material. The upper end section and the lower end section of the valve body may also comprise different materials. Preferably at least the upper end section is made of an elastic material. The lower end section may be made of an elastic material or may be made of a non-elastic material, e.g. a thermosetting plastic.

In an aspect the valve has the valve housing comprising a space defined by the housing top wall, housing bottom wall and housing side wall, in which space the valve body moves from the first position to the second position, the space near the housing bottom wall having a cross sectional diameter smaller than the cross sectional diameter of the space near the housing top wall. The housing inner surface facing the space may for instance define a seat for the upper end section of the valve body, which may be arranged such that the upper end section of the valve body cannot move in the space having the smaller cross section diameter to prevent the valve body when operated to move from moving beyond the second position. Preferably the lower end section of the valve body is guided along the inner surface of the valve housing at the smaller cross section diameter of the space. Alternatively, or additionally other stop means may be provided to stop axial movement of the valve body in the desired second position. For example an axial length of the lower end section may be configured in dependence on an axial length of the valve housing to have the lower end section of the valve body supporting against the housing bottom wall in the second position. The housing space may narrow in diameter from near the housing top wall to near the housing bottom wall continuously, e.g. with a smooth and constant inclined or sloping inner surface of the housing side wall, or stepwise, e.g. with one or more shoulders provided in the housing side wall.

In another aspect the valve has the valve housing sealed against a lower side of the mounting element by means of a flexible sealing body that is at least partly interposed between the housing top wall and the mounting element. The sealing body is arranged to minimize or prevent liquid leakage between the valve housing and mounting element. The flexible sealing body may be made of an elastic material. For example the flexible sealing body may be made of rubber or plastic.

The sealing body may comprise a sealing ring with a central hole axially aligned with the fluid passage of the mounting element and the beverage outlet opening to enable dispensing of beverage through the beverage outlet opening, central hole and fluid passage when the valve is opened in use. The central hole of the sealing body may be arranged to receive in use of the valve there through a part of an operating body introduced into the beverage outlet opening for operating the valve body, such as for spout of a dispenser unit such as a dispense adapter. The central hole may be sized and/or have diameter such that the operating body in use extents through the sealing body with an outer surface of the operating body being liquid-tightly sealed to the sealing body. For example the sealing body may be a relatively simple circular sealing ring such as an O-ring or gasket.

In an aspect the valve has the sealing body comprising a radial sealing wall extending axially from the sealing ring through the beverage outlet opening in the direction of the housing bottom wall between the housing top wall and a radial outer surface of the valve body in the first position of the valve body. The radial sealing wall interposed between the housing top wall and the radial outer surface of the valve body the may be arranged to radially seal the valve body to the housing so that in use of the valve in a beverage container beverage is reliably prevented from leaking through the beverage outlet opening.

In an aspect the valve has the upper end section of the valve body comprising an engagement portion which extents in the central hole of the sealing ring in the first position of the valve body. The engagement portion may be formed by a local thickening of the upper end section of the valve body. For example the upper end section of the valve body may comprise a bulging or dome-shaped portion arranged to extend in the central hole of the sealing ring. The engagement portion may provide a suitable engagement surface against which a part of an operating body introduced into the beverage outlet opening for operating the valve body, such as for spout of a dispenser unit such as a dispense adapter, may act to operate the valve body.

Preferably the valve body in the first position is fixedly received between the radial sealing wall to prevent the valve body from moving out of its first position unintentionally, for example prior to use. The radial sealing wall may for instance clampingly fit around the valve body. The valve body may particularly comprise an elastically deformable radial outer surface at least partly compressed against the radial sealing wall in the first position of the valve body to provide for a clamping fit. The elastically deformable radial outer surface may be defined by a rib or rib-like thickening on the outer surface of the lower end section of the valve body. The outer surface of the lower end section of the valve body may be a ridged outer surface or otherwise roughened, i.e. non-smooth, outer surface. The elastically deformable radial outer surface is preferably configured to improve a liquid-tight sealing contact between the valve body and the sealing body.

In another aspect the valve has the valve body and the sealing body made of the same elastic material. Preferably the valve consists of elastic material or elastic materials. Particularly the valve comprises solely recyclable materials. Specifically, the valve is free of metals.

In a further aspect there is provided a beverage container comprising a valve according to the first aspect described herein. The beverage container may be a keg, a Bag-in-Container (BIC), or a Bag-in-Bottle or Bag-in-Box or Bottle-in-Bottle (BIB) container. The container may comprise a neck having a container opening in which the valve is applied to seal the opening. The beverage container is preferably a beer container for containing beer.

BRIEF DESCRIPTION OF THE FIGURES

These and other aspects of the present disclosure are hereinafter further elucidated by the appended drawing and the corresponding embodiments, which are only given by way of example. The drawing is not in any way meant to reflect a limitation of the scope of the invention, unless this is clearly and explicitly indicated. These examples are given in order to better understand the invention and are not restrictive. In the drawing.

In this application similar or corresponding features are denoted by similar or corresponding reference signs. The description of the embodiments is not limited to the examples shown in the figures and the reference numbers used in the detailed description and the claims are not intended to limit the description of the embodiments, but are included to elucidate the embodiments by referring to the examples shown in the figures.

DETAILED DESCRIPTION OF THE FIGURES

Figure 1A:
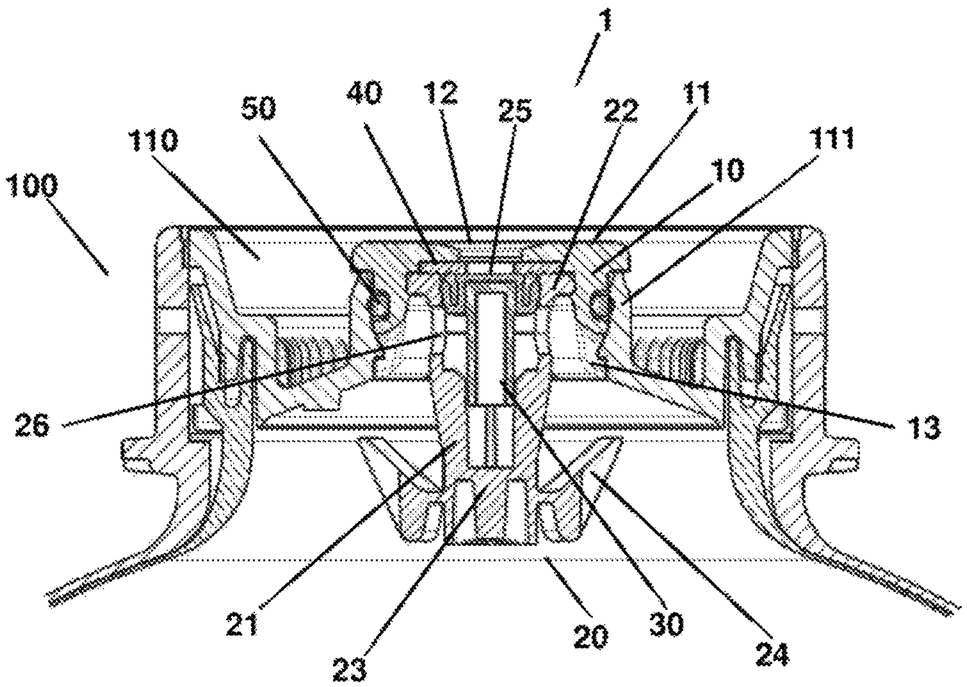
FIG. 1A,1B shows schematically in cross section part of an embodiment of a container having a body and a neck with a valve of the present disclosure in respectively a first, closed, position and a second, open, position.
Figure 1B:
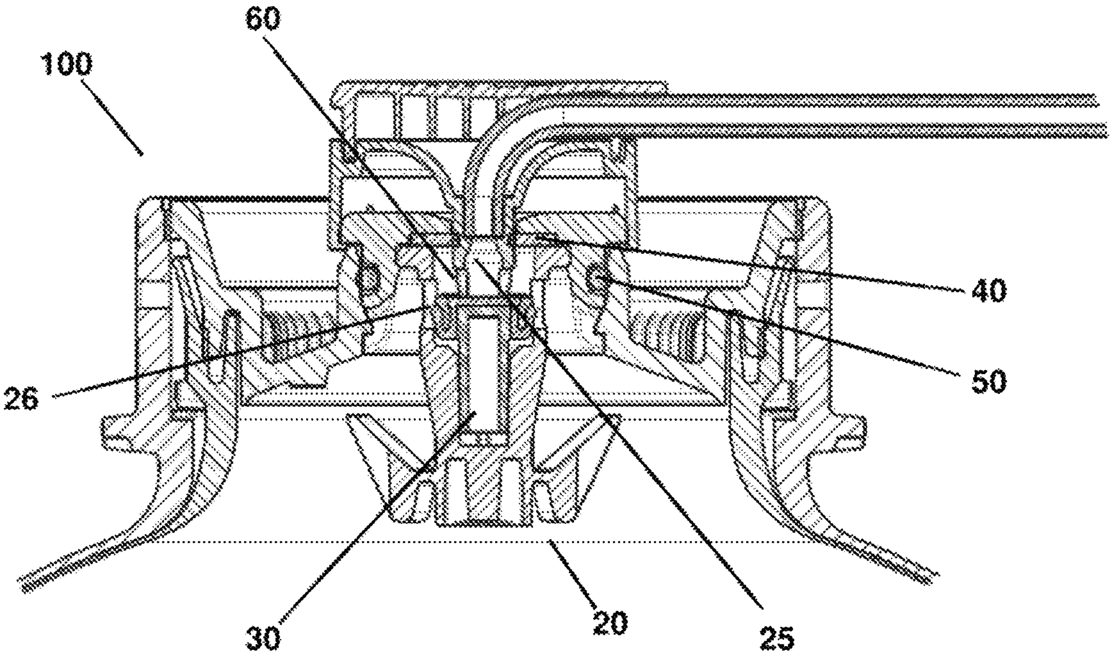
Figure 2:
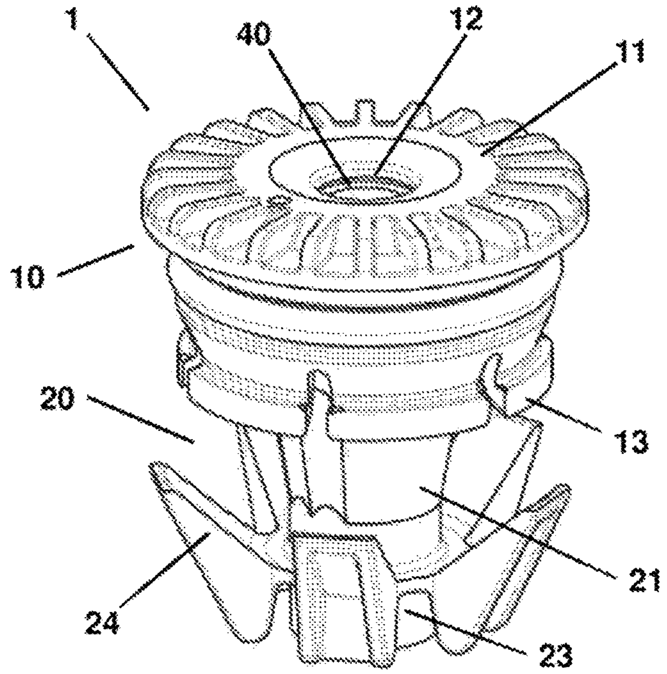
FIG. 2 shows schematically in perspective view an embodiment of a valve according to the present invention.

As shown in FIGS. 1A and 1B a beverage container 100 upper part shown in cross section is provided with a wall 110 extending from the neck and forming a lid of the container defining a container opening that provides access to a space in the beverage container. The wall may be integral with the rest of the container 100, but as shown here is a separate body formed as a mounting ring 110 that is mounted to the neck of the container. In the container opening a valve 1 is mounted to the mounting ring 110. As further shown in FIG. 2 the valve 1 comprises a mounting element 10 with a base portion 11 that extends radially from an inner side defining a fluid passage 12 through the mounting element to an outer peripheral side for sealing against a container edge at the container opening. Part of the outer peripheral side of the base portion 11 extends over an edge of an upwards directed wall portion 111 of the mounting ring 110, which wall portion 111 radially extends around the container opening. The valve 1 comprises snap means 13 such as snap fingers or a snap ring or cylinder extending from the base portion 11 arranged to fit and fix the valve 1 in the container opening against the mounting ring 110. As shown in FIG. 1 a seal means 50 is provided around a portion of the valve 1, between the snap means 13 and the base portion 11, for liquid tight sealing of the interface between valve 1 and mounting ring 110. The seal means 50 can be a separate body, e.g. an O-ring or other suitable deformable body, e.g. made of rubber, or provided as an integrally formed seal, for example by 2K injection moulding.

Below the mounting element 10 a sealing body, e.g. a sealing ring or gasket 40, is positioned against a lower side of the base portion 11. On an opposite site the gasket 40 is supported on a valve housing 20 of the valve 1. The gasket 40 has a central hole axially coinciding with the fluid passage 12 above it and a beverage outlet opening 25 provided below it in the valve housing 20.

The valve housing 20 comprises a housing side wall 21 extending axially from a housing top wall 22 comprising the beverage outlet opening 25 to a housing bottom wall 23. The housing top wall 22 is sealed against the mounting element 10 via the gasket 40. The housing bottom wall 23 as illustrated is provided with known safety wings 24 that provide protection against or prevent the valve shooting out of the container opening when, for example, the pressure inside the beverage container would unexpectedly rise above a safety pressure. The housing top wall 22 has the beverage outlet opening 25 aligned with the gasket central hole and the fluid passage 12 so that a beverage exchange, e.g. flow of beverage, is possible between the beverage outlet opening and the fluid passage when the valve is open. The housing side wall 21 has at least one beverage inlet opening 26, preferably two or more, more preferably four, arranged to allow a beverage exchange, e.g. flow of beverage, between the container space and the valve housing.

Figure 3A:
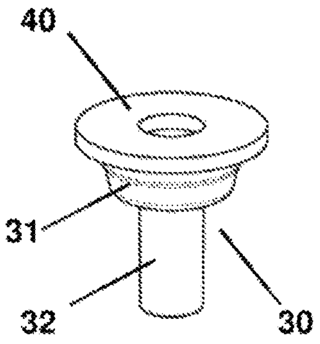
FIG. 3A,3B,3C shows schematically in three perspective views an embodiment of a valve body as used in the embodiment of a valve according to the present invention shown in FIG. 2.
Figure 3B:
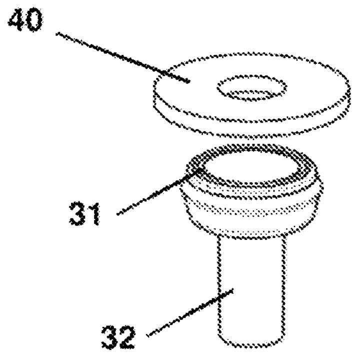
Figure 3C:
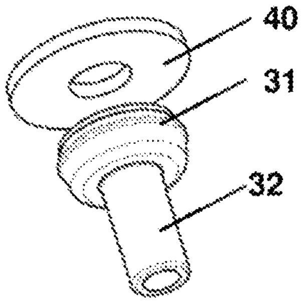

The valve 1 has a valve body 30, further illustrated in FIGS. 3A,3B and 3C together with the gasket 40, that is axially moveable through a space inside the valve housing 20 from a first position closing off the beverage outlet opening as illustrated in FIG. 1A to a second position opening a fluid connection through the beverage outlet opening as illustrated in FIG. 1B. The valve body 30 comprises a closed upper end section 31 fixedly received in the beverage outlet opening in the first position. To this end the upper end section 31 is made of an elastic material and slightly over dimensioned relative to the size of the beverage outlet opening so that the upper end section of the valve body in the first position is slightly compressed by the housing top wall 22 and clampingly held in the beverage outlet opening. Thus the valve body closes off the beverage outlet opening in the first position thereof as shown in FIG. 1A.

The valve body 30 is manually operable by inserting a spout 60 of a dispenser system, shown in FIG. 1B, through the fluid passage 12 to engage a top surface of the upper end portion of the valve body and to push the valve body away from the beverage outlet opening to the second position axially past at least a part of the beverage inlet opening 26 in the side wall, as illustrated in FIG. 1B. Thus in the second position the valve is fully open to enable a beverage flow from the container space into the valve housing via the beverage inlet opening 26 and out of the valve housing via the beverage outlet opening 25 and the fluid passage 12.

The valve body comprises a cylindrical tube-like lower end section 32 extending axially from the closed upper end 31 in the direction of the housing bottom wall 23. The lower end section 32 contacts an inner surface of the housing in both the first position as shown in FIGS. 1A and 1*n* the second position as shown in FIG. 1B.

Figure 4A:
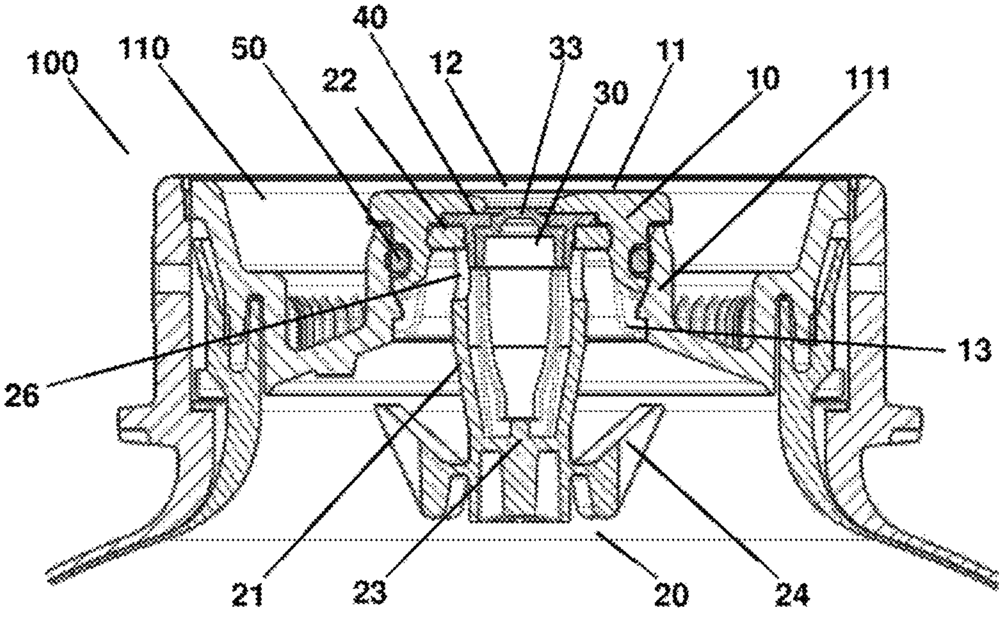
FIG. 4A,4B shows schematically in cross section part of an embodiment of a container having a body and a neck with a valve of the present disclosure in respectively a first, closed, position and a second, open, position.
Figure 4B:
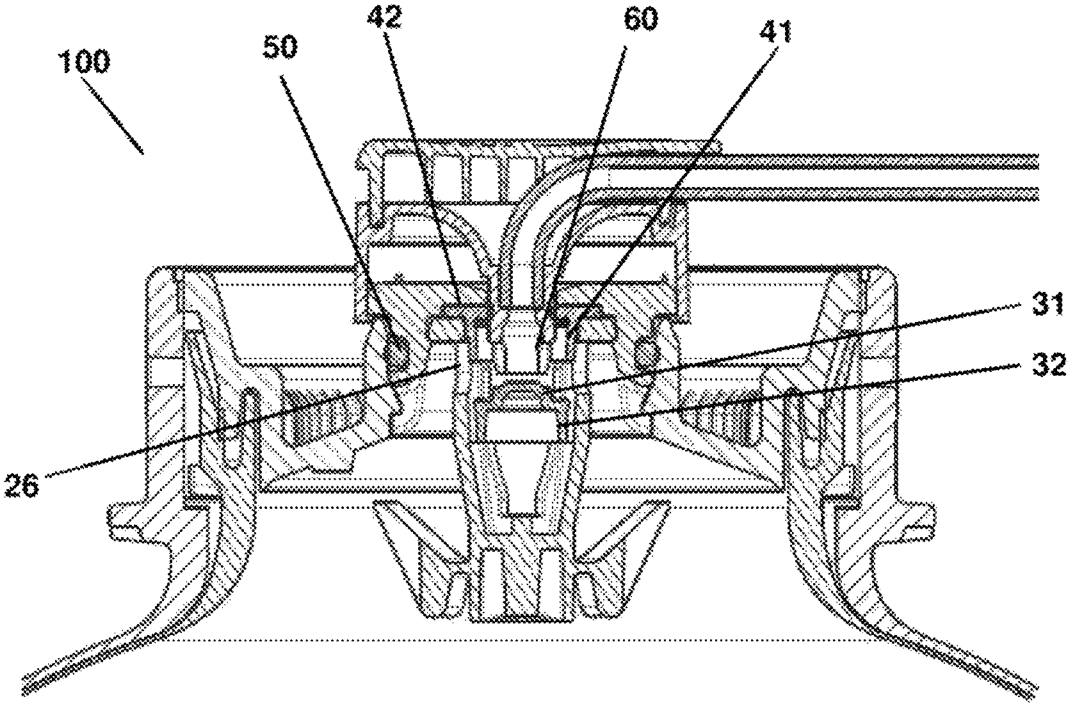
Figure 5:
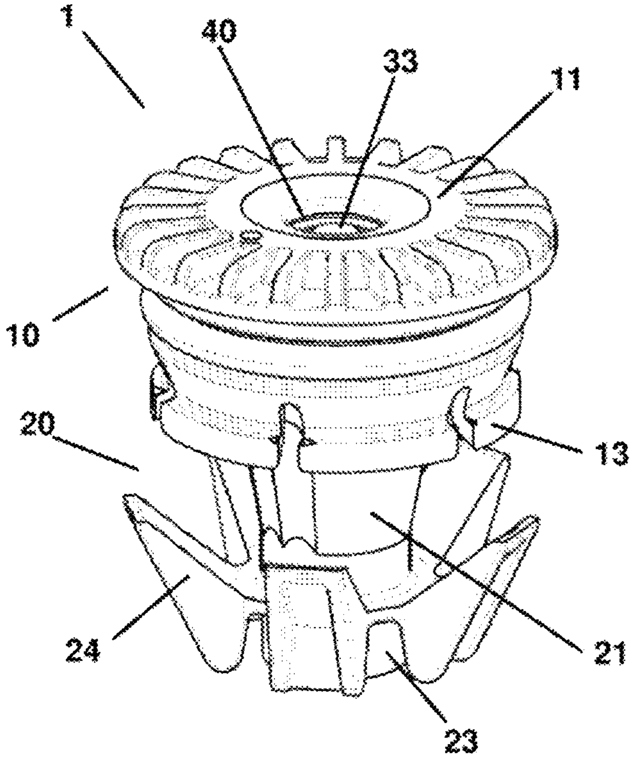
FIG. 5 shows schematically in perspective view an embodiment of another valve according to the present invention.
Figure 6A:
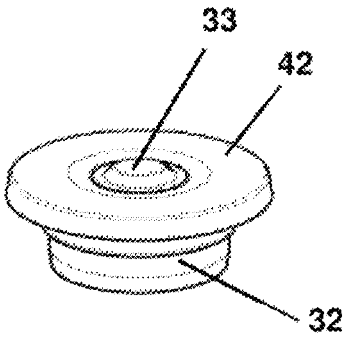
FIG. 6A,6B,6C shows schematically in three perspective views an embodiment of a valve body as used in the embodiment of a valve according to the present invention shown in FIG. 5.
Figure 6B:
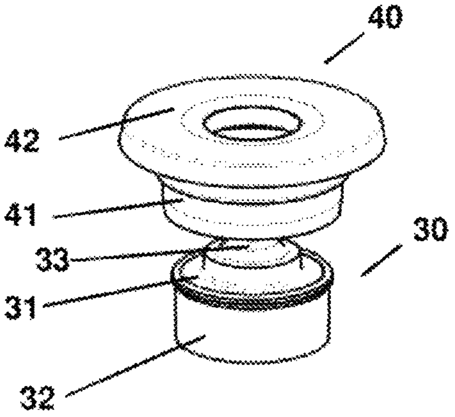
Figure 6C:
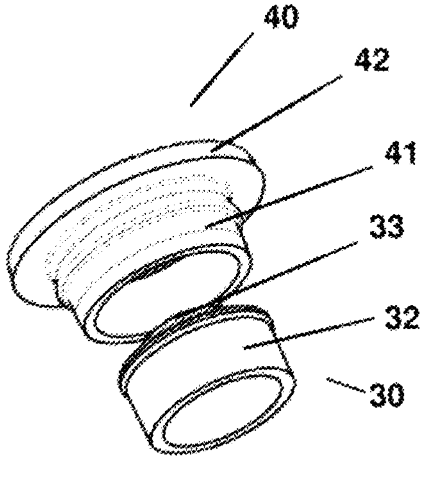

FIG. 4A,4B shows part of an embodiment of a container 1 similar to that as shown in FIG. 1A,1B, wherein however the valve 1 is provided with an alternative valve housing 20, and alternative valve body 30 and alternative sealing body 40 further illustrated in FIG. 5 and FIGS. 6A,6B and 6C. The valve 1 according to this embodiment has a valve body 30 that is smaller than the valve body of the embodiment shown in FIGS. 1, 2 and 3. The sealing body 40 comprises a cylindrical upper part 42 and a radial sealing wall 41 extending axially from the upper part 42 through the beverage outlet opening in the direction of the housing bottom wall 23 between the housing top wall 22 and a radial outer surface of the valve body. The cylindrical upper part 42 is sealingly fixed with a portion thereof between a lower side of the base portion 11 of the mounting element 10 and an upper side of the housing top wall 22. The valve body 30 comprises a closed upper end section 31 fixedly received in the beverage outlet opening in the first position and comprising an engagement portion 33 which extents in the central hole of the sealing body 40 in the first position of the valve body. The valve body in the first position is fixedly received between the radial sealing wall 41 to prevent the valve body from moving out of its first position unintentionally. Thus the valve body 30 in sealing cooperation with the sealing body 40 closes off the beverage outlet opening in the first position thereof as shown in FIG. 4A.

The valve body 30 is manually operable by inserting a spout 60 of a dispenser system through the fluid passage 12 to engage the engagement portion 33 of the upper end portion of the valve body and to push the valve body out of the sealing body 40, which remains fixed in its position, and the beverage outlet opening 25 to the second position axially past the beverage inlet opening 26 in the side wall, as illustrated in FIG. 4B. Thus in the second position the valve is fully open to enable a beverage flow from the container space into the valve housing via the beverage inlet opening 26 and out of the valve housing via the beverage outlet opening 25 and the fluid passage 12.

The valve body 30 in this embodiment also comprises a cylindrical tube-like lower end section 32 extending axially from the closed upper end 31 in the direction of the housing bottom wall 23. The lower end section 32 in this embodiment has a shorter length compared to the embodiment shown in FIGS. 1, 2 and 3. As the valve body 30 is securely clamped in the first position by the sealing body 40 there is no need for the valve body to contact an inner surface of the housing in the first position as shown in FIG. 4A. When moved in the second position as shown in FIG. 4B the lower end section 32 does about the inner surface of the valve housing to prevent the valve body from blocking the beverage inlet opening 26.

Figure 7A:
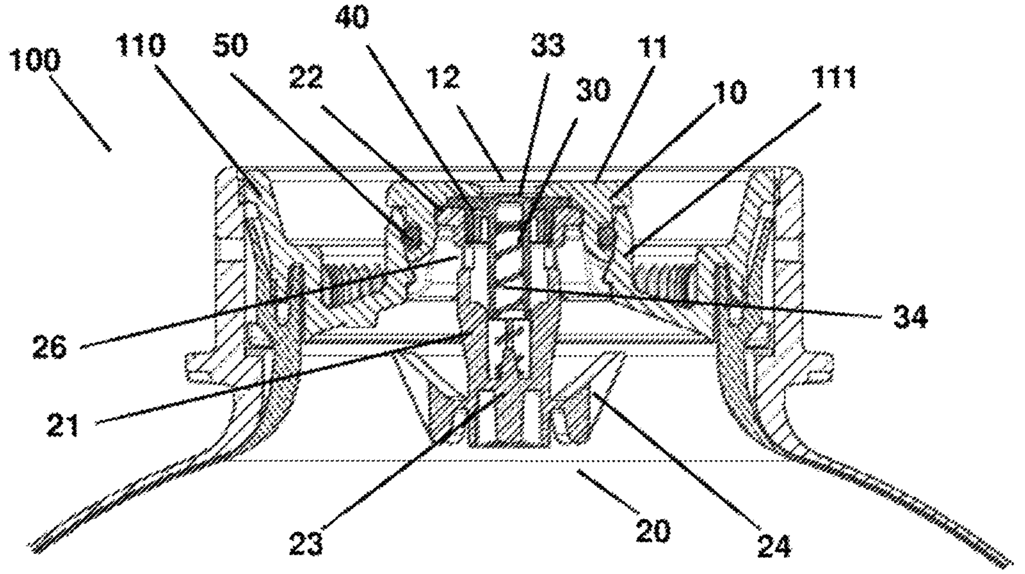
FIG. 7A,7B,7C shows schematically in cross section part of an embodiment of a container having a body and a neck with a valve of the present disclosure in respectively a first, closed, position, a second, open, position and a third, semi-closed, position.
Figure 7B:
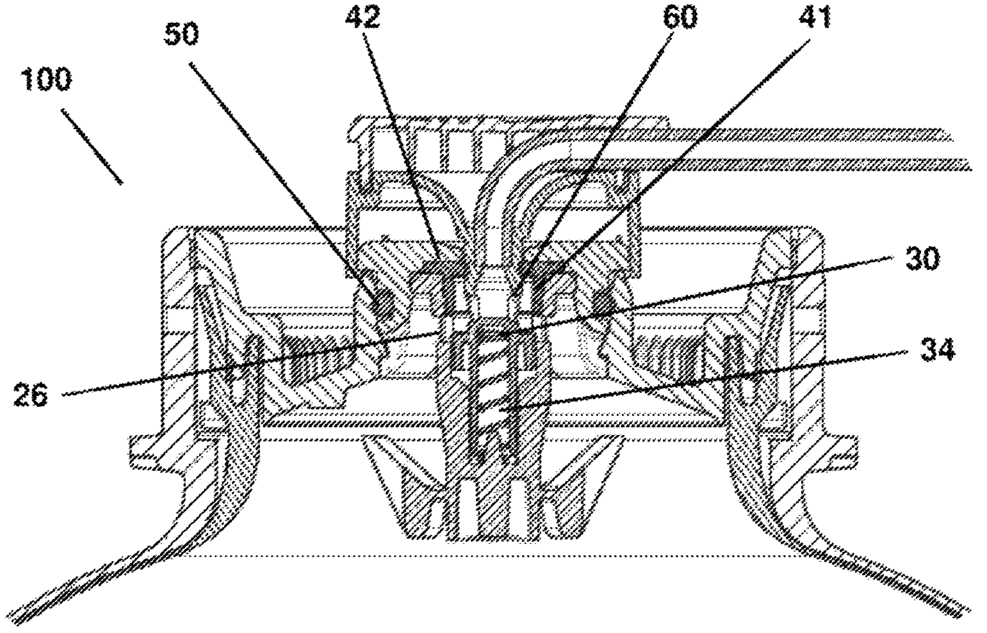
Figure 7C:
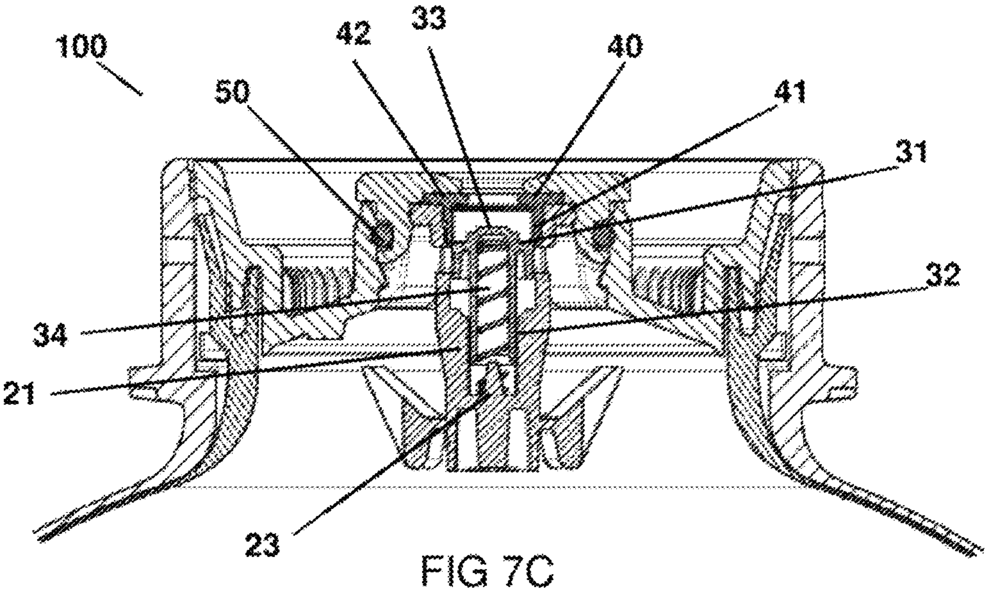
Figure 8:
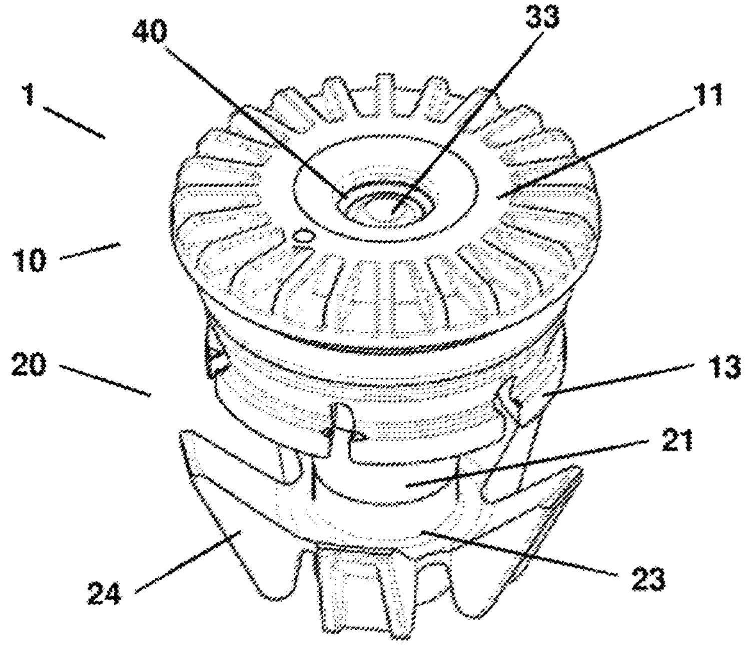
FIG. 8 shows schematically in perspective view an embodiment of another valve according to the present invention.
Figure 9A:
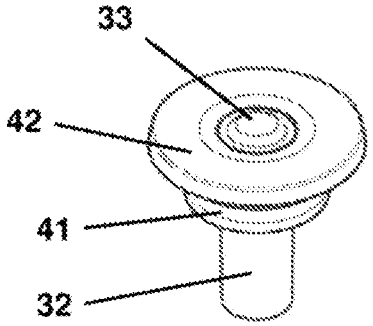
FIG. 9A,9B,9C,9D shows schematically in four perspective views an embodiment of a valve body as used in the embodiment of a valve according to the present invention shown in FIG. 8.
Figure 9B:
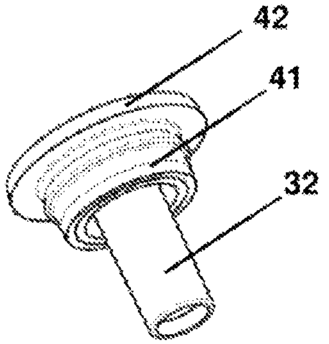
Figure 9C:
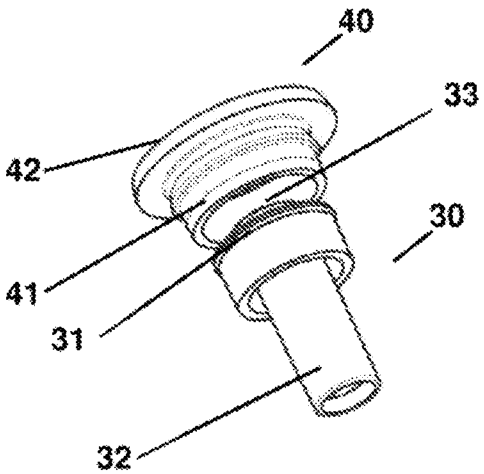
Figure 9D:
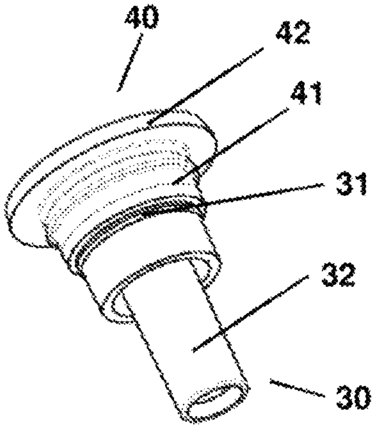

FIGS. 7A,7B,7C shows part of an embodiment of a container 1 similar to that as shown in FIG. 1A,1B and FIG. 4A,4B wherein however the valve 1 is provided with another alternative valve housing 20, valve body 30 and sealing body 40 further illustrated in FIG. 8 and FIGS. 9A,9B, 9C and 9D. The valve 1 according to this embodiment has a valve body 30 that is basically a combination of the valve body of the embodiment shown in FIGS. 1, 2 and 3 and the valve body of the embodiment shown in FIGS. 4, 5 and 6. The valve body 30 has an elongated tubular lower end section 32, similar to the valve body lower end section shown in FIGS. 1,2 and 3, extending axially from a closed upper end section 31 of the valve body towards a bottom wall 23 of the valve housing 20. The tubular lower end section 32 abuts an inner surface of the housing in both the first, closed, position and in the second, open, position of the valve body as shown in FIG. 7A and FIG. 7B respectively. The upper end section 31 is configured, similar to the valve body upper end section shown in FIGS. 4, 5 and 6, to be fixedly received in the beverage outlet opening clamped by a radial sealing wall 41 of the sealing body 40, in the first position of the valve body. The upper end section 31 comprises an engagement portion 33 which in use is engaged by opening means, such as a spout 60 of a dispenser system, for pushing the valve body from its sealing first position into the second position to open the beverage outlet opening. The valve body in this embodiment is provided with positioning means 34 configured as a simple low force helical spring acting on the valve body. The spring 34 is attached to the valve housing bottom wall 23 and extents into the tubular lower end section 32 up to the upper end section 31 of the valve body 30. In the first position of the valve shown in FIG. 7A the spring is relaxed, with no biasing force being applied by the spring on the valve body. Upon insertion of the spout 60 the valve body 30 is moved in the axial direction, i.e. downwards, towards the housing bottom wall 23 to bring the valve in the open second position, thereby compressing the spring 34. Upon removal of the spout 60 the compressed spring 34 acts on the valve body 30 in a direction opposite to the axial direction, i.e. upwards, to assist and guide the valve body together with a temporary local under pressure above the valve body to a third position shown in FIG. 7C in which the valve body with the upper end section 31 is positioned against an underside of the sealing wall 41 of the sealing body 40. In this third position the valve body 30 is correctly positioned and aligned within the valve housing 20 against the sealing wall 41 to close off the beverage outlet opening 25. The valve in use in a pressurized beverage container will by means of the pressure below the valve body accordingly allow the valve body 30 to return into the first position of the valve. The valve thus enables a reliable liquid-tight re-sealing of the beverage outlet opening and a beverage container comprising such valve is re-broachable. The spring 34 may be made of any suitable material, but is preferably made of plastic that is compatible with the other parts of the valve for sake of recyclability.

In embodiments the valve 1 and the container 100 can be made of plastic materials. Preferably the plastic material or materials are chosen such that they can be easily recycled together. Preferably the valve and container is in embodiments made of a plastic material which can be welded together. For example the container and/or the valve may be made of PET or PEN or blends thereof. Preferably the container and valve are made of the same material or made of materials that can be recycled together.

Unless otherwise defined, all technical terms used herein have the same meaning as commonly understood by one of ordinary skill in the art to which this invention belongs. Methods and materials are described herein for use in the present invention. The materials and examples are illustrative only and not intended to be limiting, unless so indicated. For the purpose of clarity and a concise description, features are described herein as part of the same or separate aspects and preferred embodiments thereof. However, it will be appreciated that the scope of the invention may include embodiments having combinations of all or some of the features described.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

The word 'comprising' does not exclude the presence of other features or steps than those listed in a claim. It also does not exclude that nothing else is present, i.e. it may also encompass the meaning of 'consisting of'. Furthermore, the words 'a' and 'an' shall not be construed as limited to 'only one', but instead are used to mean 'at least one', and do not exclude a plurality.

The invention claimed is:

1. A valve for a beverage container, the valve comprising a mounting element for mounting the valve in a container opening of the beverage container, the mounting element radially extending from an inner side defining a fluid passage through the mounting element to an outer peripheral side for sealing against a container edge at the container opening, the mounting element coupled to a valve housing comprising a housing side wall extending axially from a housing top wall sealed against the mounting element to a housing bottom wall, the housing top wall having a beverage outlet opening aligned with the fluid passage and the housing side wall having a beverage inlet opening, wherein a valve body is axially moveable inside the valve housing from a first position closing off the beverage outlet opening to a second position opening a fluid connection through the beverage outlet opening, wherein the valve body comprises a closed upper end section which is shaped to clampingly fit in the beverage outlet opening and which is fixedly received in the beverage outlet opening in the first position and operable to be moved away from the beverage outlet opening to the second position axially past at least a part of the beverage inlet opening in the side wall, and a lower end section extending axially from the closed upper end section in the direction of the housing bottom wall, the lower end section arranged to contact an inner surface of the valve housing at least in the second position.

2. The valve according to claim 1 wherein the upper end section of the valve body comprises an elastic material and a deformable radial outer surface at least partly compressed by the housing top wall in the first position.

3. The valve according to claim 1 wherein the valve body lower end section comprises a circumferential wall having an outer surface at least part of the outer surface arranged to radially abut against the inner surface of the valve housing.

4. The valve according to claim 3, wherein the circumferential wall abuts with the outer surface against the inner surface of the valve housing in the first position and is guided along the inner surface towards the housing bottom wall when the valve body is moved from the first position to the second position.

5. The valve according to claim 3, wherein the circumferential wall forms a hollow tube closed on one side by the upper end section and open on an opposite side facing the housing bottom wall.

6. The valve according to claim 1, wherein the upper end section of the valve body and lower end section of the valve body are made of one piece.

7. The valve according to claim 1, wherein the valve housing comprises a cavity defined by the housing top wall, housing bottom wall and housing side wall, wherein the valve body moves in the cavity from the first position to the second position, the cavity near the housing bottom wall having a cross sectional diameter smaller than a cross sectional diameter of the cavity near the housing top wall.

8. The valve according to claim 1, wherein the valve housing is sealed against a lower side of the mounting element by means of a flexible sealing body that is at least partly interposed between the housing top wall and the mounting element.

9. The valve according to claim 8, wherein the sealing body comprises a sealing ring with a central hole axially aligned with the fluid passage of the mounting element and the beverage outlet opening.

10. The valve according to claim 9, wherein the sealing body comprises a radial sealing wall extending axially from the sealing ring through the beverage outlet opening in the direction of the housing bottom wall between the housing top wall and a radial outer surface of the valve body.

11. The valve according to claim 10, wherein the valve body in the first position is fixedly received between the radial sealing wall.

12. The valve according to claim 9, wherein the upper end section of the valve body comprises an engagement portion which extents in the central hole of the sealing ring in the first position of the valve body.

13. The valve according to claim 8, wherein the valve body and the sealing body are made of the same elastic material.

14. A beverage container comprising the valve according to claim 1.

* * * * *